May 20, 1941.  J. E. CASNER  2,242,605
DIFFERENTIAL GEARING
Original Filed Sept. 25, 1939  2 Sheets-Sheet 1
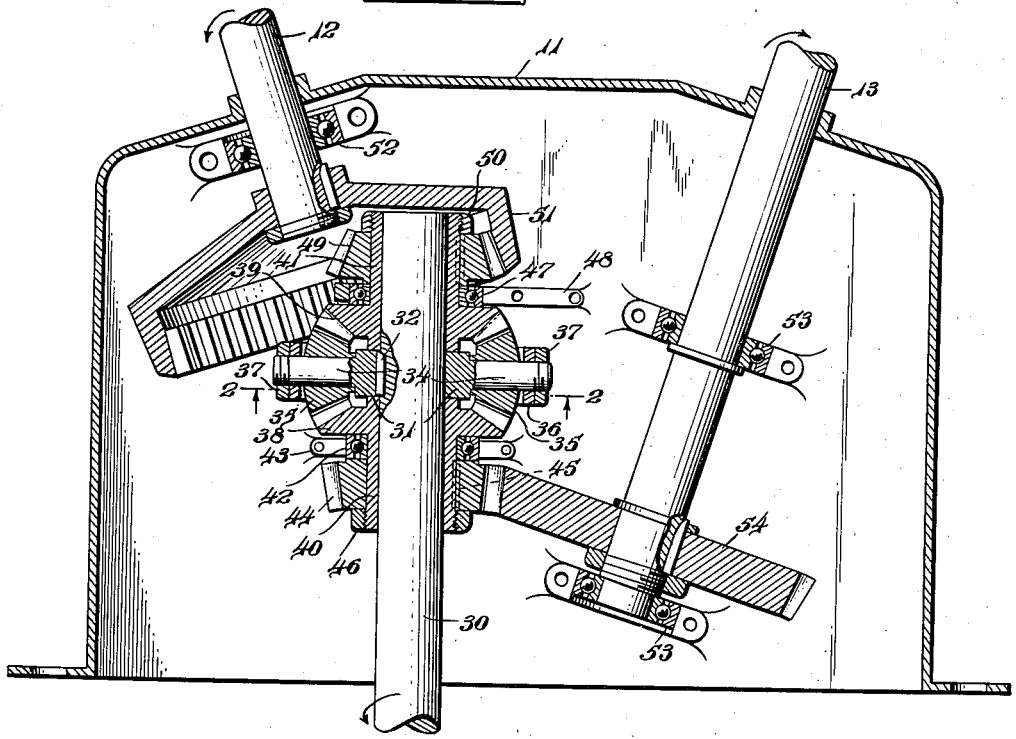
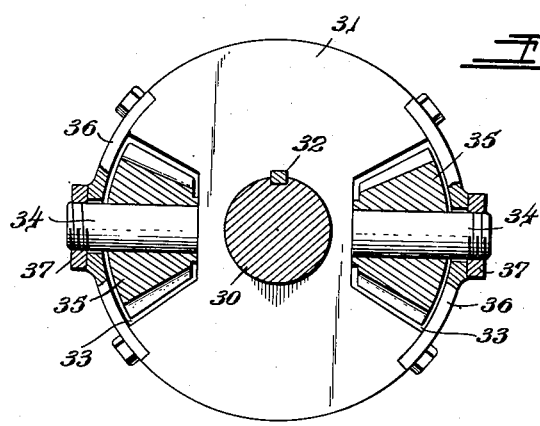
Inventor
JAMES E. CASNER
By H. G. Lombard
Attorney

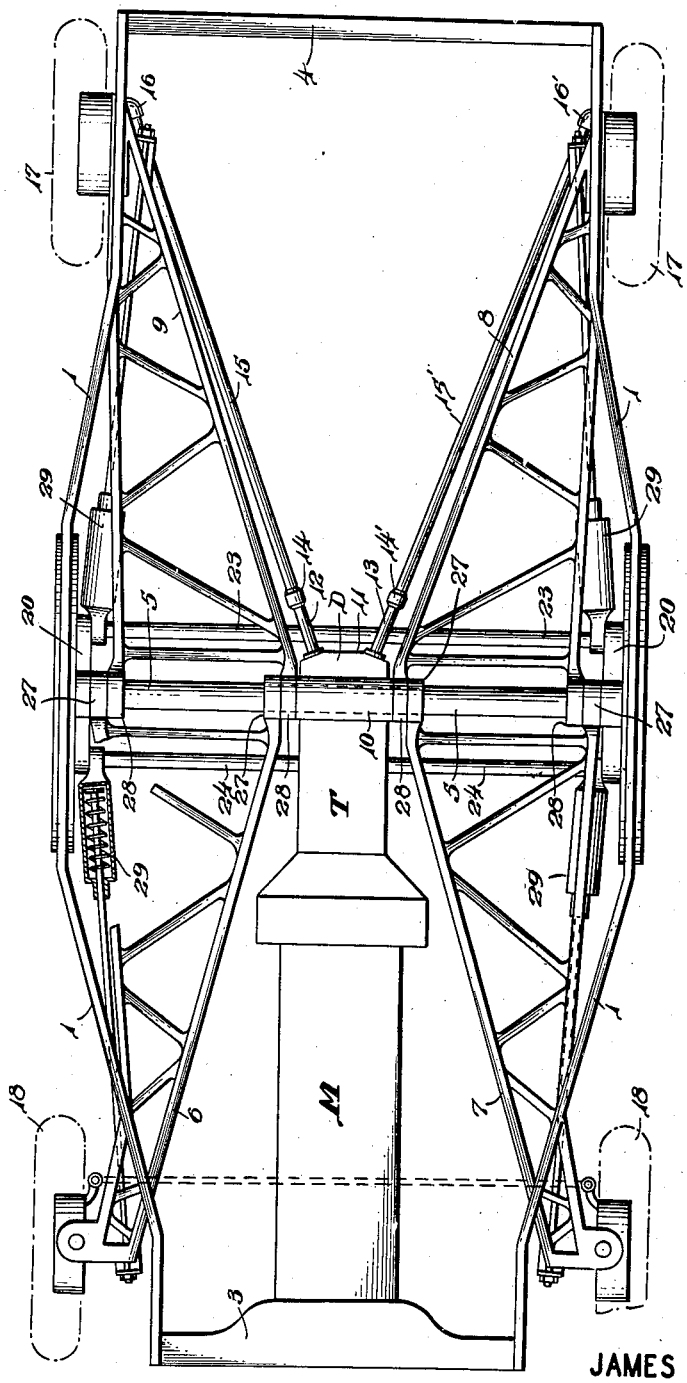

Patented May 20, 1941

2,242,605

UNITED STATES PATENT OFFICE 2,242,605

DIFFERENTIAL GEARING

James E. Casner, Alpine, Tex.

Original application September 25, 1939, Serial No. 296,484. Divided and this application May 28, 1940, Serial No. 337,727

2 Claims. (Cl. 74—310)

This invention deals with an improved form of differential gearing for automotive vehicles and relates, more particularly, to a structure of this character wherein the differential gearing associated with the driving wheels of the vehicle are located on the power shaft of the vehicle rather than on the axles for said wheels.

While the differential gearing of the present invention is one of general utility and adapted for various installations, it is particularly suited for use with vehicles of the type having a chassis embodying independent wheel suspension units together with individual driving means associated with the driving wheels of the vehicle. Such an automobile chassis construction is disclosed in prior copending application Serial Number 296,484, filed September 25, 1939, and of which the present application is a division.

A primary object of the present invention is to provide a simple, compact and reliable differential gearing mechanism which is located on the power shaft of the motor vehicle in a manner whereby power from the motor is transmitted equally and uniformly to auxiliary drive shafts connected to the driving wheels of the vehicle.

Another principal purpose of the invention is for the provision of a differential gearing of this character which is adapted to rotate the drive shafts in opposite directions such that the torque of one equalizes that of the other in a manner to eliminate a primary cause for objectionable swaying of the vehicle body at high speeds and otherwise make possible even and uniform riding qualities at all times in contrast to vehicles having only a single drive shaft which, of course, develops an unbalanced torque at high speeds and results in dangerous swaying of the vehicle body and difficult control of the vehicle.

Further objects and advantages, and other new and useful features in the construction, arrangement and general combination of parts of the invention will be apparent as a description thereof proceeds with reference to the accompanying drawings in which like reference characters designate like parts throughout, and in which:

Fig. 1 is a horizontal sectional view through a differential casing illustrating in plan the improved differential gearing of the present invention, parts thereof being shown in section;

Fig. 2 is a sectional view taken on line 2—2 of Fig. 1, looking in the direction of the arrows; and, Fig. 3 is a plan view of the chassis of a motor vehicle showing the general organization thereof including the wheel driving mechanism and illustrating the relation therein of the improved differential gearing of the present invention.

Referring now, more particularly, to the drawings, the numeral 1, Fig. 3, designates generally the longitudinal side beams or rails which together with cross members 3, 4, form the frame for supporting the body of the automobile or other vehicle. Substantially centrally between the ends of the frame is a transversely disposed horizontal main shaft by which the independent front wheel suspension units 6, 7 and substantially similar rear wheel suspension units 8, 9 are mounted in the general chassis organization.

A forwardly mounted motor M including the transmission designated generally T, is carried at one end by the forward cross frame member 3 and at its opposite end by a suitable support comprising a sleeve 10, or the like, attached to said horizontal main shaft 5. The differential mechanism D is contained within a casing 11, disposed slightly rearwardly of said main shaft 5 in close proximity to the transverse median of the chassis and is preferably of a type which is built in with the transmission together with a suitable partition to divide the volume of grease.

A pair of stub shafts 12, 13, extend from the differential casing 11 to universal couplings 14, 14' connected to a pair of opposite outwardly inclined drive shafts 15, 15' which lead into gear cases 16, 16' containing a part of the gearing for driving the rear wheels 17 of the vehicle, the front wheels thereof being designated generally 18.

The transverse main shaft 5 is journalled at either end to a pair of substantially triangular hanger units 20 having bearing openings in generally triangularly spaced relation for supporting auxiliary horizontal shafts 23, 24, and otherwise provided with means for mounting the vehicle frame member 1 over the running gear.

The mounting of the vehicle wheels is provided, as stated, by individual suspension units 6, 7, for the front wheels 18, and 8, 9, for the rear wheels 17, these suspension units all having a common pivotal connection with the main transverse shaft 5. Each of such suspension units embodies a substantial lever arm member which is provided in the manner of a lattice girder, or the like, including spaced bearing necks which are pivotally connected with said main shaft 5 as at 27 to mount the front wheel suspension units 6, 7, and as at 28 to mount the rear wheel suspension units 8, 9. Each suspension unit embodies an individual shock absorbing means 29 comprising a spring mounted take-up rod attached to the associated wheel mounting and pivotally connected to the auxiliary transverse shaft 23 or 24 nearest thereto.

Figs. 1 and 2 illustrate in detail the improved form of differential gearing of the invention which is admirably suited for use with the chassis construction just described wherein the gearing is housed within the casing 11, Figs. 1 and 3, in operative relation to the transmission T. Said casing 11 preferably is disposed slightly rearwardly of the horizontal main shaft 5 and is supported by any suitable means such as sleeve 10 attached to said transverse shaft 5 between the opposed inner bearing necks 28 of lever arms 8, 9. Inasmuch as the differential is located adjacent the transmission, the same may be of the type involving a simplified, inexpensive construction which is built in with the transmission in said casing 11 together with a suitable partition to divide the volume of grease.

As shown in Fig. 1, at a suitable point from the end of the power or transmission main shaft 30, a substantial spider wheel 31, or the like, is fastened thereto by key 32, and, referring to Fig. 2, the said spider wheel 31 is seen provided preferably in the manner of a disc-like member formed with opposing radial recesses 33 in which pintles or arms 34 are suitably disposed. These arms 34 carry the primary spider gears or differential pinions 35 held in assembled relation therewith by plates 36 which are apertured to receive said arms and otherwise bolted to the periphery of the spider wheel 31 on either side of said radial recesses 33. Nuts 37 threaded onto projecting end portions of said arms 34, limit the outward thrust of the differential pinions or spider gears 35 in operation.

On either side of said primary spider gears 35, there are meshed therewith differential side gears 38, 39, rotatably mounted on the shaft 30, and provided with sleeve extensions 40, 41, respectively. A bearing 42 supported by the bearing seat 43 in the casing is fitted onto the sleeve 40 and retained in position against the rear face of spider gear 38 by a suitable bearing cap member bolted to said bearing seat 43. A drive gear 44 is fixed to said sleeve 40 by a key 45, while a lock nut 46, threaded onto the extremity of said sleeve 40, holds the several elements in the assembled relation shown.

In a similar manner, a bearing 47 is fitted onto sleeve 41 against the rear face of differential side gear 39, said bearing being supported in the casing by a substantial arm-type bearing seat 48 and bearing cap therefor disposed wholly to one side of the power or transmission shaft 30. A drive gear 49 is keyed to the sleeve 41 of side gear 39 and these elements likewise are held in assembled relation by a lock nut 50 threaded onto the extremity of said sleeve 41 adjacent the end of said power shaft.

Said drive gear 49 is meshed with an internal gear 51 fixedly secured to the stub shaft 12 which is supported in the casing 11 as by bearing 52 and associated bearing seat. Said stub shaft 12 extends toward the associated rear wheel drive shaft 15, Fig. 3, and is connected thereto by universal coupling 14. Likewise, stub shaft 13 is connected by universal coupling 14' to the other rear wheel drive shaft 15'. The stub shaft 13 is suitably mounted in the casing as by the bearing 53, Fig. 1, and associated bearing seat and is adapted to be rotated in an opposite direction to that of stub shaft 12 by means of gear 54 keyed thereto and driven by drive gear 44 on sleeve 40, as aforesaid.

In operation, when power from the motor rotates the transmission shaft 30 and the spider wheel 31 carried thereby, the differential pinions or primary spider gears 35 on said spider wheel 31 move therewith to rotate the differential side gears 38, 39, which, through sleeves 40, 41 thereon, respectively, rotate in the same direction the drive gears 44, 49, keyed to said sleeves 40, 41, respectively. Stub shaft 13, of course, is rotated in an opposite direction to drive gear 44 which drives gear 54 fixed to said stub shaft 13. However, internal gear 51 turns in the same direction as drive gear 49, and accordingly, stub shaft 12 fixedly connected to said internal gear 51, rotates therewith in a direction opposite to that of stub shaft 13, as indicated by the arrows, whereupon the differential gearing rotates the wheel driving shafts 15, 15', Fig. 3, in opposite directions from said stub shafts 12, 13, respectively, through the universal couplings 14, 14', respectively.

From the foregoing, it will be understood that the differential gearing of the present invention is particularly advantageous at high speeds in that the torque of one wheel driving shaft equalizes that of the other and accordingly, there is eliminated a primary cause for objectionable swaying of a car body which often takes place in vehicles having only a single drive shaft due to the unbalanced torque of such single drive shaft at high speeds.

Although the wheel driving shafts 15, 15' are shown in Fig. 3 as extending to and driving the rear wheels 17 of a vehicle having a forwardly mounted motor, the differential gearing mechanism of the present invention is readily adapted for operation and use with equal effectiveness in the event a rearwardly mounted motor is employed. In a similar relation, the differential gearing may be so mounted as to provide a front wheel drive whereupon power from the differential stub shafts 12, 13, would rotate the wheel driving shafts 15, 15', as connected with suitable driving mechanism associated with the front wheels 18, as may be readily understood.

In the differential gearing of the present invention, an important advantage resides in the relatively simple, compact and reliable construction thereof including the location thereof on the transmission main shaft and near the motor such that the transmission of power is effected with a minimum of loss. In addition, the power to the wheel driving shafts is transmitted directly from the differential gearing so mounted on the transmission main shaft to provide, in this respect, a further simplified construction in which there is a considerable saving in wear and loss of power in the operating parts.

A further advantage resides in the fact that the differential gearing of the present invention permits of a desirable reduced speed of the wheel driving shafts which is considerably less than that of drive shaft arrangements heretofore employed, while also rotating such wheel driving shafts in opposite directions in a manner whereby the torque thereof is balanced, this being particularly desirable in a vehicle moving at high speed inasmuch as objectionable body sway is thereby minimized and practically eliminated.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. In an automotive vehicle including a transmission having a main shaft extending therefrom, a differential gearing associated with said main shaft and directly connected to a pair of angularly disposed shafts leading to the vehicle drive wheels, said differential comprising a spider wheel having radial arms and keyed to said main shaft, differential pinions carried by said radial arms of the spider wheel, means for retaining said pinions on said arms of the spider wheel, a differential side gear at each side of the spider wheel and meshed with said pinions of the spider wheel, sleeves associated with said side gears, bevel drive gears secured to said sleeves, and driven gears meshed with said bevel drive gears and fixed onto said angularly disposed shafts leading to the vehicle drive wheels, one of said driven gears being an internal gear, whereby said shafts are rotated in opposite directions in the operation of the differential.

2. In an automotive vehicle including a transmission having a main shaft extending therefrom, a differential gearing associated with said main shaft and directly connected to a pair of angularly disposed shafts leading to the vehicle drive wheels, said differential comprising a spider wheel having radial arms and keyed to said main shaft, differential pinions carried by said radial arms of the spider wheel, means for retaining said pinions on said arms of the spider wheel, a differential side gear on said main shaft at each side of the spider wheel and meshed with said pinions of the spider wheel, sleeves associated with said side gears and extending in opposite directions on said main shaft, bearings on said sleeves, bevel drive gears secured to said sleeves adjacent said bearings, and driven gears meshed with said bevel drive gears and fixed onto said shafts leading to the vehicle drive wheels, one of said driven gears being an internal gear, whereby said shafts are rotated in opposite directions in the operation of the differential.

JAMES E. CASNER.